(No Model.) 2 Sheets—Sheet 1.
C. VOSE.
APPARATUS FOR REFRIGERATING BRINE, COOLING LIQUIDS, AND MAKING ICE.
No. 346,446. Patented July 27, 1886.
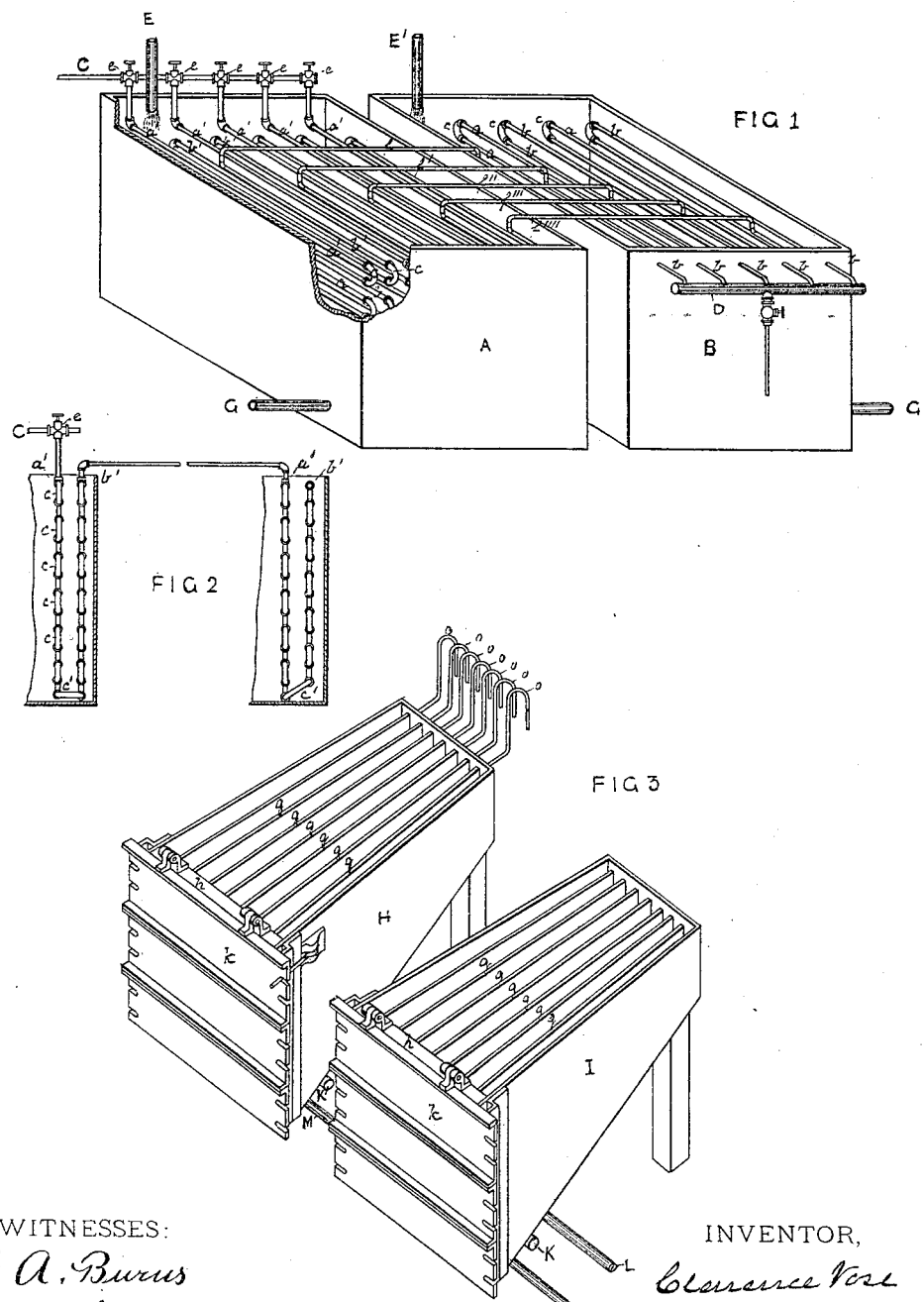
WITNESSES:
J. A. Burns
H. L. Gill
INVENTOR,
Clarence Vose
BY Bakewell & Kerr
ATTORNEYS.

(No Model.) 2 Sheets—Sheet 2.
C. VOSE.
APPARATUS FOR REFRIGERATING BRINE, COOLING LIQUIDS, AND MAKING ICE.
No. 346,446. Patented July 27, 1886.
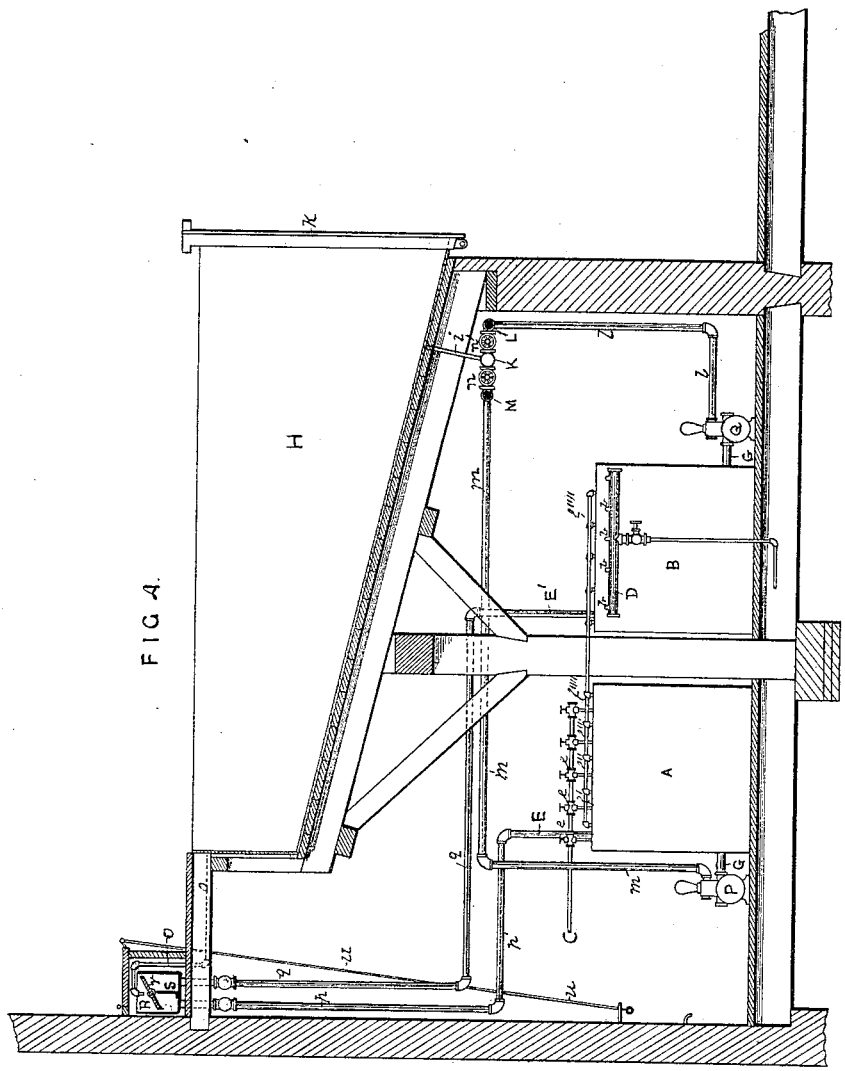
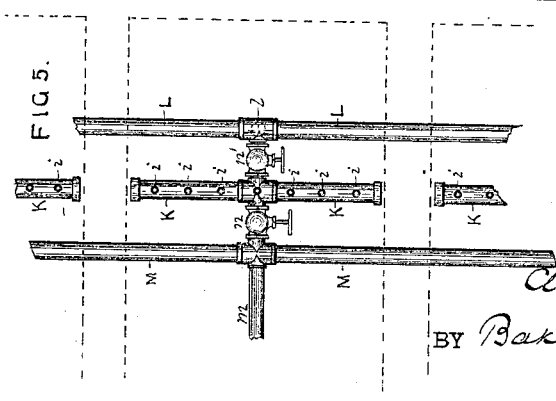
WITNESSES.
J. A. Burns,
H. L. Gill.
INVENTOR,
Clarence Vose
BY Bakewell & Kerr
ATTORNEYS.
N. PETERS. Photo-Lithographer, Washington, D.C.

UNITED STATES PATENT OFFICE.

CLARENCE VOSE, OF BROOKLYN, ASSIGNOR TO THE PRATT MANUFACTURING COMPANY, OF NEW YORK, N. Y.

APPARATUS FOR REFRIGERATING BRINE, COOLING LIQUIDS, AND MAKING ICE.

SPECIFICATION forming part of Letters Patent No. 346,446, dated July 27, 1886.

Application filed December 14, 1885. Serial No. 185,667. (No model.)

*To all whom it may concern:*

Be it known that I, CLARENCE VOSE, of Brooklyn, in the county of Kings and State of New York, have invented a new and useful Improvement in Apparatus for Refrigerating Brine, Cooling Liquids, and Making Ice; and I do hereby declare the following to be a full, clear, and exact description thereof.

I have invented my improved apparatus primarily for the purpose of cooling brine or saline water to be used in the freezing of paraffine oils, in connection with the apparatus described in Letters Patent of the United States No. 316,400, granted on the 21st of April, 1885, to Henry H. Rogers and myself; but it is applicable to the cooling of any other fluid or liquid, or to the manufacture of ice. I shall, however, describe my invention and its use in connection with the patented refrigerating apparatus above referred to, from which its application to the other uses above indicated will be readily understood.

In describing the operation of freezing paraffine distillates in the patent above mentioned we stated that in case a greater degree of cold is required, water cooled to near the freezing-point may be circulated through the partitions of the freezing-boxes, or brine previously refrigerated may be used. It is obvious that with the use of brine, or water impregnated with salt, a lower temperature than the freezing-point of pure water (32° Fahrenheit) may be employed, and that with the lowering of the temperature a corresponding degree of rapidity of the cooling operation may be attained, and also that with the use of water cooled to a temperature of only about 52° Fahrenheit, as stated in the specification of the patent above referred to, the refrigerated water, in passing through the partitions of the cooling-boxes, (which are surrounded with the hot paraffine distillate at a temperature, usually, of 100° Fahrenheit or over,) will become rapidly heated, so that the temperature of the water will gradually increase as it rises in the partitions, and, consequently, the paraffine distillate will be more rapidly frozen at the bottom than at the top, and the whole contents of the freezing-box will have to be retained under the influence of the refrigerating operation long after the lower stratum has become sufficiently hardened. This involves a considerable loss of time, and the larger the size of the freezing-boxes used the more will the difficulty be augmented. If, however, in order to increase the rapidity of the operation, refrigerated brine of low temperature is employed, two other practical difficulties are encountered—namely, first, that it is injurious to the paraffine distillate to cool it too rapidly at the beginning of the operation, and, secondly, that the brine passes off from the refrigerating-box, toward the latter part of the operation, at a temperature considerably below that of the frozen paraffine, but not cold enough to be returned immediately to the refrigerating-boxes for a second use. Another and somewhat similar loss occurs in the cooling of the brine to be used in freezing the paraffine. In order to reduce the temperature of the brine, anhydrous ammonia-gas or other volatile gas or fluid is condensed, and in that condition is introduced into pipes circulating through the brine. As soon as the condensed gas is liberated from its condition of confinement by being set free to circulate through the pipes of the refrigerator, it suddenly expands, and increases so largely in volume that it rapidly absorbs caloric from any surrounding substance, thus producing intense cold and freezing the substance through which it is passed. When, however, the gas passes from the pipes of the freezing apparatus on its return to the condensing-pump, it is still capable of producing the refrigerating effect by the absorption of heat, so that its freezing properties are by no means entirely exhausted, and it may still be used for the purpose of refrigeration; but in that condition it is not capable of cooling brine sufficiently to perform fully the operation of freezing the paraffine.

Now, the purpose of my invention, hereinafter described, is to obviate the difficulty, on the one hand, of using at first brine at a sufficiently low temperature to carry on the operation of freezing the paraffine distillate as rapidly as possible, and, on the other hand, of the incomplete exhaustion of the freezing property of the ammonia-gas when it emerges from the brine-cooling apparatus; and this I effect, so far as this apparatus is concerned, by using the waste ammonia-gas to cool brine to a temperature insufficient for the complete operation of freezing the paraffine distillate, and using this partially-refrigerated brine as a first step in the freezing of the paraffine distillate. The distillate being run into the freezing-boxes at a temperature of about 100° Fahrenheit, the brine, which has been partially cooled, (to a temperature ranging from 10° to 45° Fahrenheit, or thereabout,) is passed through the partitions of the refrigerating-box, whereby the initial heat of the paraffine distillate is considerably reduced, after which the operation of freezing the distillate is speedily finished by the introduction into the partitions of the freezing-boxes of brine which has been cooled to a temperature ranging from —10° to +20° Fahrenheit. By this means I am enabled to operate on a very hot distillate and on partially-cooled distillate (in separate freezing-boxes) at the same time, and by a continuous operation, without warming up the whole of the brine to a temperature too high to do effective work in freezing the distillate, as is the case when only one brine-cooling box is used with a single brine-circulating pump, or, what is the same thing, a series of brine-boxes connected with a single circulating-pump, which are all at the same stage of operation at a given time. By means of the use of my improved process and apparatus two or more distillate-freezing boxes arranged in series are in operation at the same time in connection with a pair or series of pairs of brine-cooling tanks, thus making a continuous operation. The partially-cooled brine from the second or warm-brine tank, in which the brine is cooled by the partially-spent ammonia-gas, is run into the first distillate-cooling box, filled with highly-heated distillate, the brine thence flowing back continuously into the same tank from which it came. At the same time the colder brine from the first or cold-brine tank (in the coils of which the brine is first expanded) is run into the second distillate-box, in which distillate has been already partially chilled, and is returned continuously to the cold-brine tank. When the distilate in one of the distillate-freezing boxes is sufficiently hardened, it is emptied and refilled with hot distillate, and brine from the warm-brine tank is turned into it. The result of this continuous operation is that a series of freezing-boxes may be used which are at different stages of the operation, and thus more work is accomplished in the same space of time and with the same expenditure of power of the ammonia-condensing apparatus.

The apparatus which I employ for freezing the paraffine distillate is the same as is described in the patent before referred to, (No. 316,400,) and consists of boxes rectangular in vertical cross-section, but having an inclined bottom, so as to be shallower at the rear than at the front end, and also narrowing in width toward the rear end. These boxes are divided into compartments by means of hollow partitions, through which the cooling-liquid (water or brine) is circulated.

In the accompanying drawings, Figure 1 represents a pair of brine-cooling tanks, a portion of one being removed to show the arrangement of the coils of pipe. Fig. 2 is a vertical section of part of the two brine-tanks, showing the connection and arrangement of the last series of pipes in each tank. Fig. 3 represents a pair of distillate-freezing boxes also detached. Fig. 4 is a vertical elevation or side view of a pair of brine-tanks and one of the freezing-boxes connected by pipes and valves. Fig. 5 is a plan view of the pipes and valves connecting the brine-tanks and freezing-boxes.

Like letters of reference designate the same parts.

The brine-cooling apparatus, Fig. 1, consists of two tanks, in one of which the brine is reduced to the lowest degree of temperature required for the freezing of paraffine distillate, and in the other of which the brine is cooled to a temperature not so low as in the first tank. I have only shown two such tanks in my drawings; but a series of them may be used, and where for any purpose connected for the refrigerating of any other liquid to different degrees of temperature, or where the initial temperature of the liquid to be cooled or the size of the tanks is such that the anhydrous ammonia-gas, when it leaves the second tank, is not fully spent, three or more such tanks may be used, the various coils of pipes in each tank being connected with the corresponding coils in the next succeeding tank, as hereinafter described, and, if desired, the partially-cooled liquid from the other tanks of the series may be fed from one tank of the series to the other until it reaches the first tank in which the lowest temperature is attained. With this explanation, I will proceed to describe the construction and operation of the pair of tanks shown in the drawings.

A and B are two tanks constructed of any convenient size and shape, of iron, wood, or other suitable material. The shape and size which I have found convenient for the purpose described in this specification is a rectangular box of sixteen feet in length, six feet in height, and five feet in width. The first tank, A, (which, for convenience, I call the "cold-tank,") is furnished with vertical rows of pipe $a\ b$, placed horizontally and connected at their ends with return-bends $c$, each end of each pipe $a$ being similarly connected with the adjacent end of the pipe immediately below it, with this exception, that one end of the uppermost pipe, $a'$, in each alternate vertical series rises up from the tank at the top and connects with a horizontal main or feed pipe, C, furnished with a stop cock or valve, $e$, (through which main C the condensed ammonia-gas is introduced into the apparatus,) and that one end of the lowest pipe, $a$, in each alternate vertical row is connected by a return-bend, $c'$, with the adjacent end of the lowest pipe, b, in the adjoining vertical row b. (See Fig. 2.) Thus every pair of vertical rows of pipes a and b forms a separate coil, the several coils or pairs not being connected together. The uppermost pipe, b', of each pair terminates in a horizontal pipe, f, (these horizontal pipes being marked f, f', f", &c.,) which horizontal pipe extends to and connects with the topmost pipe, a, in one of the coils of pipes in the second tank, B. In describing the coils in the brine-tanks I have stated that the pipes are laid horizontally, by which I mean substantially horizontally, a slight inclination in either direction not being a material departure from my invention. The second tank, B, is similarly constructed, and is furnished with a corresponding series of vertical coils of horizontally-laid pipes, each coil consisting of two vertical rows, a and b, connected at their ends by return bends c, the top pipe, b, of each coil of pipe in the first tank, A, being connected with the topmost pipe, a, of the corresponding coil in the second tank, B, and the end of each top pipe, b, in the second tank, B, being connected with a horizontal main pipe, D, from which the spent ammonia-gas passes back to a pump or any other condensing apparatus, to be prepared by condensation for repeated use. The tanks A and B are each furnished with an inflow-pipe, one, E, and the other, E', at the top, and an outflow-pipe, G, at the bottom. The outflow-pipe G from each tank is connected with a pump, P and Q, by which a continuous circulation of the cooled brine through the distillate-freezing apparatus and brine-tanks is maintained. If these tanks are used in connection with the distillate-freezing apparatus before described, they are supplied with brine to be refrigerated by the return of brine from the distillate-freezing-boxes H and I, Fig. 3, and the condensed ammonia-gas, by which the brine is to be cooled, is introduced into the pipe a' of each coil of the first tank, A, separately from the gas-main C by means of the valves e, or into so many of the coils a and b as it may be found advisable or necessary to use, depending upon the degree of temperature to which the brine is to be lowered. The condensed ammonia-gas being forced into the main C and coils a b of the first tank, A, passes downward through the first half, a, of each coil, and then up through the second half, b, of the same coil, expanding as it passes, and emerges through the horizontal pipe f, and enters the first half, a, of each coil of the second tank, B, and thence, passing downward and again upward through the second half, b, of each coil, passes in a spent or expanded condition to the outlet-pipe D, whence it is drawn, by a pump or other device, to the condensing apparatus to be condensed for repeated use. The result of this operation is that the brine in the first tank, A, will be cooled down to a much lower temperature than that in the second tank, B. As used by me in the freezing of paraffine distillate, the temperature of the brine passing from the first tank into the distillate-freezing chambers will be about —10° to +20° Fahrenheit, and that from the second about +10° to +45° Fahrenheit; but this temperature may be raised and regulated as desired by the rapidity with which the brine passes through the tanks and the amount of ammonia-gas introduced through the coils of pipe by means of the valves e, or by shutting off one or more of the coils from connection with the gas-main C.

In using this brine-refrigerating apparatus in connection with a distillate-freezing apparatus, as before described, (and shown in Fig. 4,) the partially-cooled brine from the second or warm tank, B, is run continuously into the distillate-freezing box H, newly filled with paraffine distillate at about 100° Fahrenheit, and this supply of brine from the warm-tank B is kept up for about five or six hours, and then, the distillate having become partially cooled, the valves are shifted and cold brine from the cold-tank A, at about from —10° to +20° Fahrenheit, is introduced into the same freezing-box H, the flow being continued for about eighteen hours longer, when the distillate will be entirely frozen. Of course the temperatures above given will vary at different stages of the operation, and both temperatures and time will be modified by the initial temperature of the paraffine distillate when introduced into the freezing-boxes, what I have given being the ordinary temperatures and time when the distillate is introduced into the freezing-boxes at about 100° Fahrenheit. The continuous circulation of the brine, and thereby the continuity of the operation, is maintained by returning the brine (which comes from the warm-brine tank constantly from the freezing-box in which the hot distillate is placed during the first stage of the process) to the warm-tank B, and returning the brine flowing from the distillate-freezing boxes at the second stage of the process to the cold-brine tank A from which it came. I will therefore explain arrangement of pipes and valves by which the these changes are effected. By reference to Fig. 4, it will be seen that the distillate-boxes are placed on a higher level than the brine-tanks A B. In Fig. 4 only one distillate-box, H, is shown, the other, I, (see Fig. 3,) being of similar construction and placed near to and alongside of box H. These freezing-boxes may be constructed substantially as described in Letters Patent No. 316,400 of 21st of April, 1885, before referred to—that is to say, the boxes taper in width and depth toward the rear end, (see Fig. 3,) and have vertical partitions g, which touch or nearly touch the bottom of the boxes, and are attached to the end piece of the boxes, and are kept in place at the front end by a cross-bar, h, at top of the box. The doors k of these freezing-boxes are removable, or preferably hinged to the cross-bar h at top, so as to be opened by swinging them outward from the bottom, so as to allow of the discharge of the frozen distillate. The partitions $g$ are hollow, and through the partitions the brine or other refrigerating liquid is circulated, entering each partition by a small pipe, $i$, (see Fig. 3,) which connects at its lower end with a transverse supply-pipe, K, one of which extends transversely and horizontally under each freezing-box. Each of these pipes K is connected both with the cold-tank A and with the warm-tank B by an arrangement of pipes shown in Fig. 4 and in detail in Fig. 5. The mains M and L run horizontally under the series of freezing-boxes parallel with the supply-pipes K, and each supply-pipe K is separately connected by a stop cock or valve, $n\ n'$, with the cold-main M and with the warm-main L. The cold-main M is connected by a pipe, $m$, with the pump P, which draws the cold brine through the pipe G from the cold-tank A, while the warm-main L is similarly connected by a pipe, $l$, with the pump Q, which draws the warmer brine from the tank B. It will be observed that the term "warm" as applied to the tank B and the brine circulated therefrom, only means not so cold as the brine from the cold-tank A. By the arrangement of pipes and valves just described a circulation of either cold or warm brine may be established through any number of the freezing-boxes H I by closing the valve $n$ and opening the valve $n'$, or vice versa. The brine from either of the tanks A or B entering the partitions of the freezing-boxes H or I through the pipes $i$, traverses the partitions and passes out at the top through an outflow-pipe, $o$, (see Fig. 4,) and flows into a transverse trough, R, from which return-pipes $p$ and $q$ pass downward and connect with the inflow-pipes E E′ of the brine-tanks A B, the pipe $p$ returning to the cold-tank the brine which came from it, and the pipe $q$ returning to the warm-tank the brine which came from it. The trough R is divided by partitions, or there may be a separate trough for each brine-tank, so as to prevent the commingling of the cold brine from one freezing-box with the warmer brine from another. In each trough R is a hinged diaphragm, $r$, which may be inclined in either direction, and a partition, $s$, extending longitudinally through the trough and vertically from the hinged center of the diaphragm $r$ to the bottom of the trough, divides it into two water-ways, with one of which the pipe $p$ to the cold-tank A is connected, and with the other the pipe $q$ to the warm-tank B. Now, if the diaphragm $r$ is inclined in the direction shown in Fig. 4 the brine overflowing from the freezing-box H through the pipe $o$ is conducted by the diaphragm $r$ into the return-pipe $p$, connecting with the cold-tank; but if the inclination of the diaphragm is reversed the brine is returned through the pipe $q$ to the warm-tank B. The diaphragm is readily shifted into either position by means of a rod or rope, $u$.

By using a series of distillate-freezing boxes and brine-refrigerating tanks and filling them with hot distillate successively when the contents of each preceding tank in the series has been partially cooled by means of the partially-cooled brine from the warm-tank, and following the use of the warm brine in each freezing-box with the use of the cold brine from the cold tank, the process may be continued without intermission, effecting a great saving of time, as the several freezing-boxes will be ready to be discharged in succession and the operation of employing one tank will be attended to while the process of freezing is going on in other freezing-boxes of the series.

As before suggested, my brine-cooling apparatus may be used alone for cooling any liquid requiring refrigeration, and any other of the well-known substitutes for ammonia-gas for refrigerating purposes which operate to produce cold by expansion may be employed in connection with my apparatus with like effect of utilizing the partially spent or expanded gas to produce a less degree of refrigeration.

In addition to the advantages already referred to as attending the use of my invention there is another which may be mentioned. When the condensed ammonia-gas enters at the top of the coils of pipe in the brine-tanks, if the surrounding brine is comparatively warm the ammonia rapidly absorbs the caloric, expands freely, and passes down one-half of the coil of pipes and up the other to the point of exit; but as the environment of the coils of pipe becomes colder the expansion of the condensed ammonia-gas becomes sluggish, and the heat is less rapidly absorbed from the brine. Now, when the condensed gas reaches the bottom of the coil, it cannot pass upward, otherwise than in an expanded and gaseous condition, so that it will not pass upward and out of the coil until it is more or less expanded, as it might do if the exit from the coil were at the lower end, even though drawn through the coil by an exhaust-pump; hence the advantage of placing the gas-expansion tubes in coils, one-half of which descend and the other half ascend, so that the condensed gas which has only partially expanded in the first or descending half of the coil is forced to expand into a gaseous condition in the second or ascending half, thus preventing its escape in an unexpanded state, and securing a higher degree of expansion of the gas and refrigeration of the surrounding liquid.

Having thus described my improvement, what I claim as my invention, and desire to secure by Letters Patent, is—

1. As an apparatus for freezing paraffine distillate, two or more distillate-freezing chambers furnished with hollow partitions or passages traversing the interior of the chamber, for the flow of refrigerated brine or other refrigerating-liquid, in combination with two or more refrigerating-tanks (for cooling the refrigerating-liquid) furnished with coils for the passage of condensed ammonia-gas or similar refrigerating agent, the coils of one tank being connected with corresponding coils in the other tank or tanks of the series, so arranged, substantially as described, as that the partially-spent ammonia-gas from the coils of one tank may pass into and be more fully expanded in the corresponding coils of the other tank or tanks, the coils being connected with a gas-condensing and circulating apparatus, and the brine-tanks being connected with the hollow partitions or passages of the distillate-freezing chambers by pipes or valves or cocks for shifting the flow of brine from any of the brine-tanks into any of the distillate-freezing chambers, substantially as described, and for the purpose set forth.

2. As an apparatus for refrigerating brine or other liquids, two or more tanks for holding the liquid to be refrigerated, each tank being furnished with a coil or series of coils of pipe, each coil consisting of two vertical rows of horizontally-laid pipe connected at their ends with return-elbows, the top pipe of the first vertical row of each coil in the first tank of the series being connected with the inflow gas-main from a gas-condenser, and the top pipe of the second vertical row of the same coil being connected by a branch pipe with the top pipe of the first vertical row of the corresponding coil in the next succeeding tank, each separate coil of one tank being similarly connected with the corresponding coil in the next tank of the series, and the second half of each coil in the last tank of the series being connected with an outflow-gas main connecting with the gas-condenser, substantially as described.

In testimony whereof I have hereunto set my hand this 22d day of October, A. D. 1885.

CLARENCE VOSE.

Witnesses:
WALTER JENNINGS,
WM. P. HOWE.